US008463423B2

(12) United States Patent
Batmaz et al.

(10) Patent No.: US 8,463,423 B2
(45) Date of Patent: Jun. 11, 2013

(54) METHODS AND SYSTEMS FOR MEASUREMENT AND CONTROL OF PROCESS PARAMETERS

(75) Inventors: Ediz Batmaz, Grand Rapids, MI (US); Rasheed Mohammed, Sicklerville, NJ (US); Khalid Abdelrahim, Sewell, NJ (US); Mohammed Karkache, Deptford, NJ (US)

(73) Assignee: Campbell Soup Company, Camden, NJ (US)

( * ) Notice: Subject to any disclaimer, the term of this patent is extended or adjusted under 35 U.S.C. 154(b) by 89 days.

(21) Appl. No.: 12/803,385

(22) Filed: Jun. 25, 2010

(65) Prior Publication Data

US 2011/0320060 A1    Dec. 29, 2011

(51) Int. Cl.
*G06F 19/00* (2011.01)

(52) U.S. Cl.
USPC ............. 700/207; 700/265; 702/50; 702/130; 702/138

(58) Field of Classification Search
USPC ............ 700/115, 207, 265, 274, 285; 702/50, 702/130, 138
See application file for complete search history.

(56) References Cited

U.S. PATENT DOCUMENTS

| 5,261,282 | A | 11/1993 | Grabowski et al. |
|---|---|---|---|
| 5,722,317 | A | 3/1998 | Ghiron et al. |
| 5,741,979 | A | 4/1998 | Arndt et al. |
| 6,776,523 | B2 | 8/2004 | Simunovik et al. |
| 7,004,620 | B2 | 2/2006 | Simunovik et al. |
| 7,112,954 | B2 | 9/2006 | Palazoglu et al. |
| 7,162,328 | B2 * | 1/2007 | Hornbaker et al. ........... 700/213 |
| 7,213,967 | B2 | 5/2007 | Simunovik et al. |
| 7,562,580 | B2 * | 7/2009 | Rezgui et al. ................... 73/716 |
| 2002/0044590 | A1 | 4/2002 | Simunovik et al. |
| 2004/0213322 | A1 | 10/2004 | Simunovik et al. |
| 2004/0228387 | A1 | 11/2004 | Palazoglu et al. |
| 2004/0254419 | A1 | 12/2004 | Wang et al. |
| 2005/0025797 | A1 | 2/2005 | Wang et al. |
| 2005/0079132 | A1 | 4/2005 | Wang et al. |
| 2005/0107870 | A1 | 5/2005 | Wang et al. |
| 2006/0133449 | A1 | 6/2006 | Simunovik et al. |
| 2007/0010702 | A1 | 1/2007 | Wang et al. |

(Continued)

FOREIGN PATENT DOCUMENTS

| EP | 1623048 | 8/2004 |
|---|---|---|
| EP | 1809565 | 5/2006 |

(Continued)

OTHER PUBLICATIONS

Kantt et al., "Temperature Mapping of Particles During Aseptic Processing with Magnetic Resonance Imaging", Journal of Food Science, vol. 63, No. 2 (1998).

(Continued)

*Primary Examiner* — Sean Shechtman
(74) *Attorney, Agent, or Firm* — Gary M. Cohen

(57) ABSTRACT

Systems and methods for monitoring various process parameters, primarily in connection with processes for the sterilization of particulate foods in a continuous thermal process, make use of application specific integrated circuits (ASIC) that provide process-related data for batch or continuous thermal treatment when the circuit is embedded in a particle subjected to such treatment. The preferred methods are described in connection with process design, and with at least near real-time process control using process data provided by such circuits.

35 Claims, 3 Drawing Sheets

U.S. PATENT DOCUMENTS

| | | | |
|---|---|---|---|
| 2007/0018639 A1 | 1/2007 | Palazoglu et al. | |
| 2007/0211784 A1 | 9/2007 | Simunovik et al. | |
| 2009/0306632 A1* | 12/2009 | Trovato et al. | 604/890.1 |
| 2009/0315727 A1* | 12/2009 | Goltenboth | 340/586 |

FOREIGN PATENT DOCUMENTS

| | | |
|---|---|---|
| WO | WO 01/69193 | 9/2001 |
| WO | WO 2004/067786 | 8/2004 |
| WO | WO 2006/023261 | 3/2006 |
| WO | WO 2006/053329 | 5/2006 |
| WO | WO 2006/121447 | 11/2006 |

OTHER PUBLICATIONS

Kantt et al., "Temperature Mapping of Particles During Aseptic Processing with Magnetic Resonance Imaging", Journal of Food Science, vol. 63, No. 2, pp. 305 to 311 (Mar. 1998).

* cited by examiner

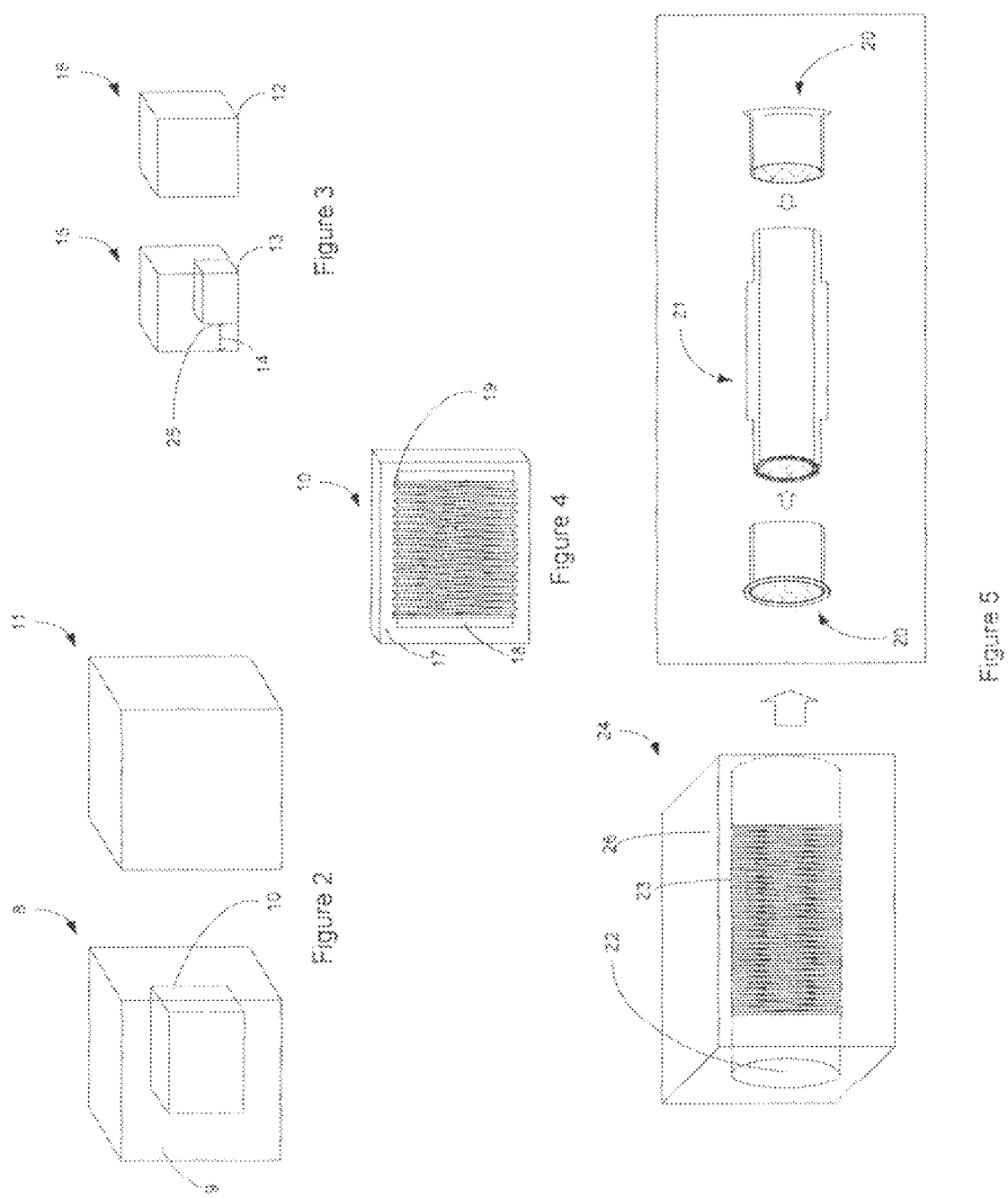

METHODS AND SYSTEMS FOR MEASUREMENT AND CONTROL OF PROCESS PARAMETERS

FIELD OF THE INVENTION

The present invention relates generally to systems and processes suitable for measuring process parameters of process systems, primarily systems for processing food products, making use of application specific integrated circuits identifiable by radio frequency signals.

BACKGROUND OF THE INVENTION

Most commercially produced, packaged foods (including beverages) go through a thermal process to render that particular food safe for consumption. The intensity of this thermal process varies depending on the physical characteristics and chemical composition of the food, the type of packaging, and the shelf life desired. Thermal treatment can be achieved either prior to or after filling the product into the package. For example, low acid foods where product is thermally processed prior to filling into the package can employ vastly different processing systems as compared to product that is thermally processed in-package.

To render a thermally processed food product safe for consumption, the manufacturer needs to know how much heat is applied to the product. This heat treatment can be observed as a function of temperature and time. Product temperature is heated to a certain degree and held at-least this temperature for a prescribed amount of time, thus corresponding to a "lethality" value which is conventionally used in the food industry to standardize and quantify the intensity of a thermal process. With pure liquid foods, such as beverages and broths, the temperature of the product can be measured easily by temperature probes at prescribed locations in a process system. The use of conventional temperature probes, however, is not preferred and is in practice almost impossible when temperature is desired to be measured within particulate foods (i.e., liquid foods with native constituent particles) such as soups. In these circumstances, only the liquid fraction of the particulate food can be monitored for temperature by the use of conventional temperature probes. A distinct challenge arises when temperature measurements of the different native constituent particles in the foods are desired.

In any sterilization process, the goal is to ensure commercial sterility in the product as a whole. When the product is comprised of a homogeneous liquid fraction, measurement can be facilitated by use of conventional temperature probes. On the contrary, when the product is comprised of several different particles suspended in a liquid fraction, such as in a garnished soup, it can be extremely difficult to predict sterility in the product as a whole based on the process data that is readily available in a conventional continuous flow sterilization system. The difficulty arises from the fact that different particle types in the product may heat up differently from the liquid stream, thus abrogating the utility and veracity of temperature probe measurements of the liquid faction as an indicator of particle temperature. Particle residence time distribution in the process system adds to the complexity of ensuring commercial sterility of all components.

Batch blending of products in a kettle or ribbon blender, for example, for soup products containing large particulates, can result in particle distribution issues for several reasons, including insufficient blending time, inappropriate agitator design, inappropriate agitator speed or direction, kettle size and shape, garnish level and size, overall liquid amount, particle density, and liquid viscosity. It can, therefore, be difficult to measure a variety of process conditions of interest such as, for example, the direction, orientation, speed, or temperature of a particle in a mixing vessel. Indeed, direct particle temperature measurement using conventional techniques, such as temperature probes, would be significantly challenged, if at all possible, by the movement of particles during such unit operation. It is, therefore, desirable to further optimize such batch process conditions.

Generally speaking, the temperature of a single particle may not be uniform throughout the whole volume of that particle. For example, the outer surface of the particle can heat faster than the core of the particle because the outer surface of the particle is in direct contact with the liquid fraction. Although this is the case for some conventional operations, where either hot water or steam is used as the heating medium, it may not be the case for thermal operations where the food is heated by other means such as infra-red, microwave, direct solar heating, radiation heating, inductive heating, or resistive heating. In addition to temperature variation within the volume of a single particle, different types of particles will flow at different speeds within the liquid fraction as the entire food volume is being pumped through the process system. The particles that flow faster through the system will be subject to the heat treatment for less time.

Aseptic thermal processing generally involves continuous sterilization of the food material using a suitable heat exchanger. The type of heat exchanger used is dictated by properties of the food material such as, for example, viscosity, particle size, and homogeneity. Some food products, such as juice, milk, and broth are homogeneous products and can be processed in plate heat exchangers. Other food products, such as soups having solid particles, can be processed in heat exchangers that can handle particles, such as tubular heat exchangers. To be able to quantify the thermal process for an aseptic operation, one would need to be able to identify the slowest heating particle at its core by assessing known characteristics of the particles, such as size, thermal conductivity, or density. Once the slowest heating particle has been identified, the temperature of this particle (at its coldest spot) can be known at the entrance and exit of the holding tubes associated with the heating system being used, to ensure proper thermal treatment as measured by a variety of decisional factors such as cook-value, lethality, etc. Currently, the art lacks a system that can monitor process conditions, such as direct temperature of the particles, in at least near real time during a continuous flow thermal treatment.

Food scientists and engineers have been experimenting with various technologies to quantify and validate food manufacturing processes. These conventional attempts can generally be classified in two categories, residence time distribution of different particle components and temperature data of the particle components at critical locations in the system.

U.S. Pat. No. 5,261,282 to Grabowski et al., for example, discloses the use of implanted radio frequency transponders (in the form of RFID chips) to identify the residence times of simulated particles passing through a continuous processing system. U.S. Pat. No. 5,741,979 to Arndt et al. discloses the use of dipole antenna marker implants in the particles and microwave transducer detectors to measure particle residence times. Systems such as these, however, do not provide information pertaining to the temperature of the particles of interest, and cannot provide pertinent temperature process information relating to the slowest heating, fastest moving particle(s) of a system.

Further conventional attempts have been made to either measure only temperature or both temperature and residence time of food particles in a continuous processing system. Magnetic resonance imaging thermometry, such as that disclosed by Kantt et al., "Temperature Mapping of Particles During Aseptic Processing with Magnetic Resonance Imaging", Journal of Food Science, Volume 63, No. 2 (1998), is a non-obstructing and non-contact method, but is not sufficiently rapid enough to provide in-line real time measurement. Eight seconds were taken to image a single 64×64 cross-sectional temperature map. During this time, however, a considerable quantity of product can pass the detector unmonitored. Thus, the number of cross sections that can be observed is very limited, i.e., the detection of the initial location where the lethal thermal treatment is achieved may not be determined for all possible cases.

Other conventional methodologies, with associated shortcomings, include those implementing thermoresistive implants. One such example of this is the local magnetic temperature measurement approach disclosed in U.S. Pat. No. 5,722,317 to Ghiron et al., which is directed to the use of spherical paramagnetic particles for implants and detector coils around the pipes for sensors. This approach then implements a correlation between falling magnetic field strength and temperature increase to calculate the implant temperature from the signals of three sensor coils. However, the negative correlation between the measured magnetic field and the increasing temperature employed by this approach can cause a non-conservative temperature estimation, i.e., the resulting calculation can indicate a higher temperature than is actually present in the implant. This is due to the fact that magnetic field reduction can be caused by a variety of factors other than temperature increase in the implant, such as obstruction of detection by other materials (e.g., other food particles that are present). Still further, the magnetic thermometry approach can be highly susceptible to electro-magnetic interference, thereby greatly increasing the complexity of data collection or veracity of the collected data.

Another methodology is disclosed in U.S. Pat. No. 7,112,954 to Palazoglu et al., which makes use of the change in the magnetic field strength of two or more magnets attached to each other along the same pole and which are secured in a carrier particle which emulates the properties of a real food particle. The magnets are placed in simple, forced attachment using an adhesive having a specific release temperature. When the adhesive melts, at a prescribed threshold temperature, at least one of the magnets rotates to the opposite pole, thereby creating a detectable change in the magnetic field. The location in the processing system where this change in the magnetic field is detected, for a given magnet pair, is assumed to be the location where the simulated particle temperature reaches the threshold temperature. The shortcoming of this methodology is that similar to the method disclosed by Ghiron et al., a direct temperature measurement is not provided. Rather, only an indirect indication of temperature is provided. Further, the resulting indication of temperature is simply one of being above the predetermined threshold temperature of the adhesive, rather than a direct numerical temperature value. Further, there is not a way of uniquely identifying a magnet pair when multiple magnet pairs are introduced into the system at the same time.

Therefore, there is a need in the art for systems and methods for directly monitoring the particulate temperature of thermally treated heterogeneous fluids having a plurality of constituent food particles.

SUMMARY OF THE INVENTION

In accordance with the present invention, methods and apparatuses are disclosed which use application specific integrated circuits (ASIC) to provide process-related data for batch or continuous thermal treatments, such as particulate food sterilization, pasteurization, and/or preservation processes. The circuits are preferably embedded in a particle subjected to such treatment, and methods are described for providing at least near real-time process control derived from process data provided by the circuits while subjected to such treatment.

A preferred system for monitoring process conditions of a batch or continuous thermal treatment uses at least one application specific integrated circuit (ASIC) identifiable by radio frequency signal, coupled with at least one sensor capable of measuring at least one process condition. The system further has at least one transceiver capable of communication with the circuit and at least one particle embedded with the circuit. The particle passes within a heterogeneous fluid having a plurality of constituent food particles subjected to direct thermal treatment, indirect thermal treatment, or other food processing treatments. Aseptic processes or non-aseptic processes can be employed, where appropriate. The circuit-embedded particle can be an actual constituent particle or a particle that simulates any number of constituent particle properties.

Some currently preferred systems utilize a circuit placed within a native constituent particle. Other currently preferred systems utilize a circuit placed within a simulated particle for passing through the continuous processing system. Such circuits can be exposed at the surface of the particle, or can be positioned within the particle, preferably at least near the center of the particle, so that the particle emulates at least one physical, thermal, or dielectric characteristic of a native constituent particle.

Physical characteristics of interest can include, without limitation, moisture content, salt content, shape, and/or density. Dielectric properties can include, by way of example only, electric conductivity, magnetic permeability, relative dielectric constant, relative dielectric loss factor, and/or dielectric loss angle.

Other preferred methods further include a data logging system for measuring and storing information pertaining to at least one process condition, as measured by at least one circuit-embedded particle. Such data logging can be along at least a portion of the process path, at-least one discrete location along the process path, or both. Accordingly, such data logging can be continuous, intermittent or combinations of both.

Process conditions which can be measured using such a system can include, by way of example but without limitation, liquid pH, particulate temperature, liquid temperature, particulate speed, particulate location, particulate rotation, liquid speed, liquid nutrient characteristics, chemical characteristics, system pressure, particulate orientation, particulate position, and/or liquid salinity. Nutrient measurement can, for example, identify the amounts, concentrations, or ratios of sugar, protein, starch, and/or various vitamins or minerals that may be present in the liquid fraction of the heterogeneous fluid. Nutrient measurement can further include identifying the amounts, concentrations or ratios of various phytochemicals such as, but not limited to, phytosterols, carotenoids, tocotrienols, isoflavones, omega-3 fatty acids, phospholipids, nucleosides, nucleotides, glucosamine, ferulic acid, and/or coumaric acid.

Particulate or liquid temperature measurements can be made from about −40° C. to about 200° C., preferably between 100° C. to 140° C. Preferred systems can measure temperature with an accuracy of 1° C. System pressure measurements can be made up to 1 kpsi, preferably up to 150 kpsi.

Yet another preferred method of measuring process conditions uses at least one application specific integrated circuit identifiable by radio frequency signal having at least one sensor capable of measuring at least one process condition, providing the application specific integrated circuit in a heterogeneous fluid, and measuring at least one process condition as determined by the circuit at-least one location within the process system. The location lies along at least a portion of the length of the process path, at a discrete cross-section of the process path which is subject to a transceiver, or both. In this way, for example, particulate orientation, particulate position, or both, can be measured relative to the process space.

BRIEF DESCRIPTION OF THE DRAWINGS

FIG. 2 is a schematic view showing a circuit-embedded particle having an embedded transducer, as compared to an actual native food particle.

FIG. 3 is a schematic view showing a planar cross section of a circuit-embedded particle, as compared to an actual native food particle.

FIG. 4 is an enlarged, schematic view showing an embedded transducer.

FIG. 5 is an exploded, schematic view showing a transceiver antenna coupled with a process tube.

DETAILED DESCRIPTION OF PREFERRED EMBODIMENTS

Preferred methods and apparatuses in accordance with the present invention are described in connection with a process for the sterilization of particulate foods in a continuous flow heat exchanger. It should be understood that the invention has broad application to any type of process monitoring, including continuous or batch processing, particularly where a process parameter is to be measured wirelessly using a small device of a size of approximately 5 mm (or less) in any dimension.

Application specific integrated circuits (ASIC), which are otherwise known and used in a variety of industries, are used for various sensing applications. Depending on the application, a suitable printed circuit board assembly (PCBA) can have different components and can operate by the use of different protocols. When identification (ID) is desired in addition to sensing, an on-chip memory device can be used to store a unique ID. In such a system, the sensing data communicated by the integrated circuit (IC) is accompanied by the ID of the chip. The communication protocol can be either wired or wireless. For wireless applications, such communication can be established by the use of radio signals, similar to the communication protocols found in radio frequency identification (RFID) systems. In some cases, an antenna connected to the IC is used to receive and send the radio signals to a transceiver. Such a unit, including the antenna, is often referred to as a transducer.

Figure 1:
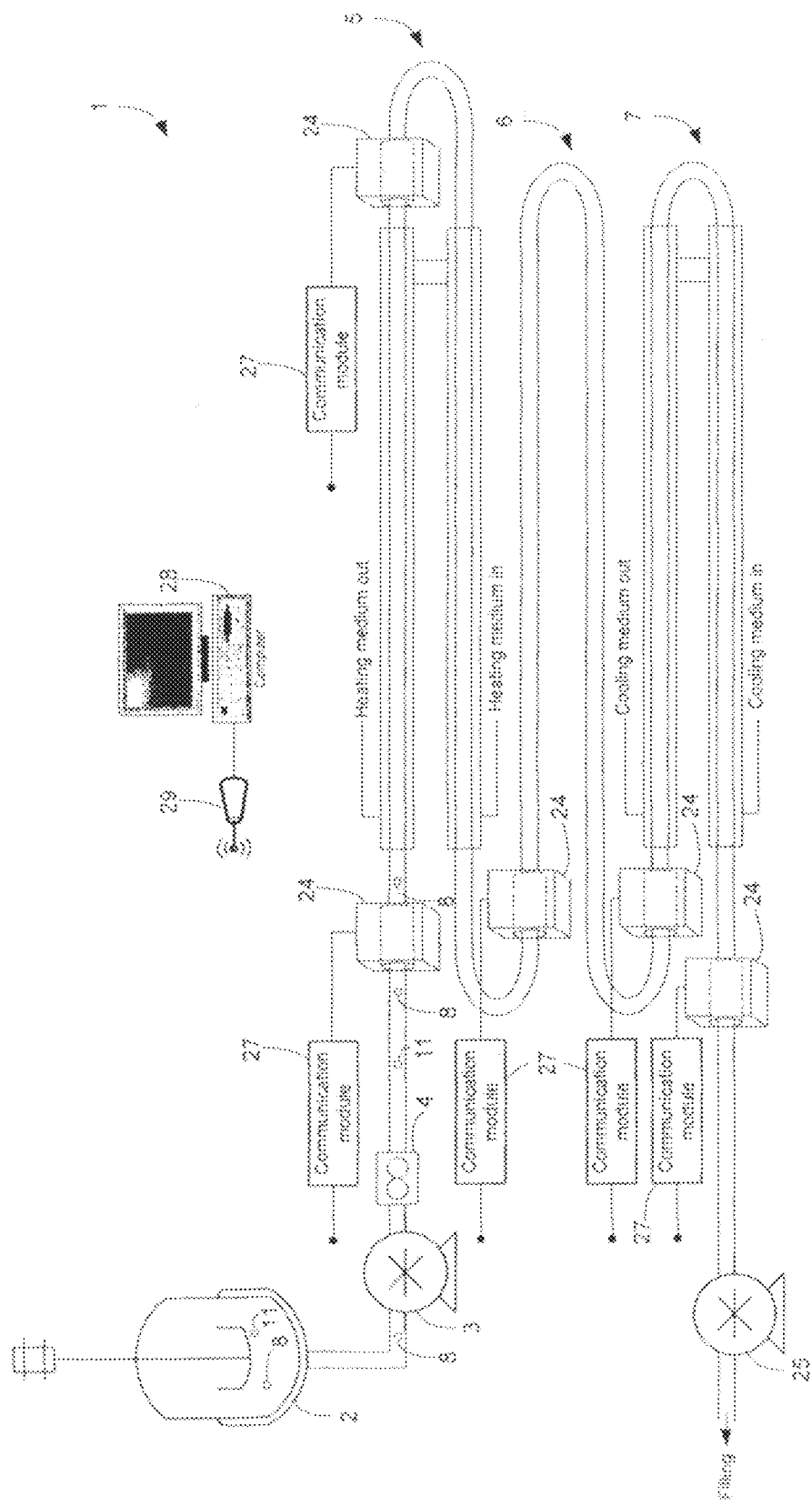
FIG. 1 is a schematic view showing various components of a thermal process system.

FIG. 1 shows an apparatus 1 which is exemplary of a continuous cooking process in which food particles such as vegetables in a garnished soup are sterilized in a flowing stream. It should be understood that the apparatus 1 shown in FIG. 1 is illustrative only, and that any of a variety of different systems, capable of processing any of a variety of different food products, can similarly be implemented in accordance with the present invention.

In the illustrated apparatus 1, and as is otherwise known and conventional in the industry, a soup is blended in a blending kettle 2, and the blended soup is pumped into the tubes of a tubular heat exchanger through a timing pump 3. The pump speed can be adjusted using a variable frequency drive to maintain a prescribed flowrate, which can be measured using a flowmeter 4. The blended soup enters the sterilizing heat exchanger through the discharge of the timing pump 3, passing through a heating section 5, a holding section 6, and a cooling section 7, and is then filled into a container. Depending on the diameter of the various tubes which comprise the apparatus 1, the overall holding tube length and the flowrate of product can be adjusted to reach a predetermined holding time. A positive displacement pump 25 is preferably placed between the discharge of the cooling section 7 and downstream filling equipment, and can be used to regulate backpressure throughout the various tubes by controlling the speed of the pump 25.

In accordance with the present invention, a circuit-embedded food particle 8 is provided which can pass through the apparatus 1 during active preparation of the food product. The circuit-embedded food particle 8 is preferably configured to monitor the progress of the slowest heating and fastest flowing food particle passing through the apparatus 1, and can either be implemented using a native food particle or as a simulated food particle formed in the shape of a native food particle.

Referring to FIG. 2, the circuit-embedded food particle 8 can incorporate encapsulated transducer 10 embedded in a native constituent food particle or a simulated food particle, preferably at the center of the food particle 8 or at least near the center of the food particle 8. As is best shown in FIG. 4, the transducer 10 includes a printed circuit board assembly (PCBA) 18 that has an embedded ASIC with an integrated sensor for monitoring a desired parameter, such as temperature and/or pressure. For communication purposes, an antenna 19 is coupled with the PCBA, and is preferably air-coiled around the PCBA. To avoid electrical discharge, the transducer 10 is also preferably potted with a suitable insulation material 17, as is otherwise known and used in the industry. For a circuit-embedded food particle 8 implemented as a simulated food particle, the transducer 10 is preferably surrounded by an encapsulation material 9 which can be chosen to match certain physical, thermal and/or dielectric properties of a native food particle including, but not limited to, geometry, volume, density, thermal diffusivity, thermal conductivity, specific heat capacity, and/or electric conductivity.

The fastest flowing particle in the process system will generally be the one that has neutral buoyancy with respect to the liquid stream. A practical way of achieving neutral buoyancy is by matching the density of the particle to the density of the liquid. To match the density of a native food particle, the density of the encapsulation material 9 of a simulated food particle should be chosen so that the density and volume of the transducer 10 is taken into account.

To determine the thermal diffusivity of the encapsulation material 9, the first step is to determine which native food particle will be heating slowest at its coldest spot. This can be determined experimentally by exposing all the actual native food particles to the same boundary conditions while monitoring their temperature at their center points. This can also be determined theoretically if the thermal diffusivities of all the actual native food particles are known. In this case, a finite element modeling (FEM) software can be used to determine the slowest heating food particle. Once the slowest heating food particle is determined, the thermal diffusivity of the encapsulation material 9 can be determined.

Both the slowest heating food particle 11 and the circuit-embedded food particle 8 are shown in FIG. 2. For the illustrated circuit-embedded food particle 8, the encapsulated transducer 10 is placed in the middle and the encapsulant 9 is surrounding the transducer 10. If the particle shape is not an irregular shape, symmetry can be used to determine thermal diffusivity of the encapsulation material. In this exemplary embodiment, the slowest heating food particle 11, and the circuit-embedded food particle 8, have the shape of a rectangular prism, such as might be encountered, for example, with a cubed carrot. It should be understood that the shape of the circuit-embedded food particle 8 can be varied, as desired, and can include both regular and irregular shapes.

FIG. 3 shows both a simulated food particle 15 and a native constituent food particle 16 which have been cut in half along all three planes to make use of symmetry. The center point of the food particle 12 is its coldest spot. For the simulated food particle 15, the corresponding point 13 is within the transducer volume and the heat transfer mechanism within the transducer volume is complex due to its heterogeneous nature. Therefore, a conservative assumption is made that the temperature measured by the transducer 10 is equal to the temperature at the surface of the transducer 10 having the shortest distance to the outer surface of the encapsulant 9. In the illustrative embodiment shown in FIG. 3, the distance 14 is the shortest distance. This leads to the assumption that the temperature measured by the transducer 10 is the same as the temperature at the location 25. This is a conservative assumption because the temperature sensor within the transducer 10 is in an inner layer of the transducer and its measured temperature will be lower than the temperature at the location 25, as long as the transducer is heating up. Taking advantage of this conservative assumption, the thermal diffusivity of the encapsulant 9 should be chosen so that when the food particle 16 and the simulated food particle 15 are exposed to the same boundary condition, the temperature at the point 12 will be the same as or slightly higher than the actual temperature at the location 25. This can be determined by trial and error using FEM, or other suitable software.

Thermal diffusivity is a function of thermal conductivity, density and specific heat capacity, and can be calculated using the following formula:

$$\alpha = \frac{k}{\rho C_p}$$

where $\alpha$ is the thermal diffusivity, k is the thermal conductivity, $\rho$ is the density, and $C_p$ is the specific heat capacity. As the density of the encapsulation material 9 was determined previously, the ratio of thermal conductivity to the specific heat capacity can be calculated using the results of the FEM analysis. The way that the encapsulation material will be applied depends on the material chosen. It is possible to use different potting materials and, therefore, different application methods for the encapsulation. Regardless of the manner in which the encapsulation material 9 is applied, the transducer 10 can be placed within the encapsulation at the discretion of the user. It is preferable that the encapsulated transducer 10 is placed at least near the center of the encapsulation. Still further, the encapsulated transducer 10 can be exposed at the surface of the encapsulation, or within the encapsulation, as desired.

The circuit-embedded food particle 8 can be detected using a transceiver antenna 24 in proximity to the circuit-embedded food particle 8 at certain points. Since the encapsulated transducer 10 will be traveling in the process tubes of the apparatus 1 under the influence of the timing pump 3, and ending with the filling station, the transceiver antenna 24 is preferably positioned in proximity to the product tubes of the apparatus 1 at selected locations. Because conventional process tubing used in the food industry is made of stainless steel, which will block radio frequency (RF) signals, the product tubes are preferably provided with an equivalent RF transparent tube, such as a glass or polymer tube, wherever an RF antenna is to be placed. The RF transparent tube material chosen should also be resistant to high temperature and pressure. By way of example, FIG. 5 shows stainless steel (SS) ends 20 in connection with an RF signal transparent tube 21.

FIG. 5 further illustrates an example of a suitable RF transceiver antenna 24. At least one antenna structure 23 can be used within a single RF transceiver antenna 24. In this illustrative example, the antenna structure 23 includes a drive antenna for providing power to the transducer 10 and a receive antenna for receiving the signal back from the transducer 10, to develop an antenna structure 23 which operates as a transceiver. To maximize the signal strength between the antenna structure 23 and the transducer antenna 19, the drive and receive antennas are coiled around a hollow tube 22 having a slightly larger diameter than the diameter of the product tube that receives it. The hollow tube 22 is then preferably housed in a waterproof box 26 to protect it from the environment.

A transceiver antenna 24 is positioned around the process tubes of the apparatus 1 wherever a condition-measuring food particle 8 needs to be monitored (e.g., for ID and temperature). FIG. 1 shows an illustrative embodiment including five transceiver antennas 24, although other configurations are equally possible.

Suitable placement of the transceiver antennas 24 facilitates proper repeatable communication between each transceiver antenna 24 and an encapsulated transducer 10 traveling within a food mixture passing through the process tubes and at the flow rates normally observed in food sterilization applications. These locations are preferably along at least a portion of the length of the process path, at a discrete cross-section of the process path subject to a transceiver, or both. Accordingly, such locations can be at the entrance of the heating section 5, at the middle of the heating section 5, at the entrance of the holding section 6 (exit of the heating section 5), at the exit of the holding section 6 (entrance of the cooling section 7) and at the exit of the cooling section 7, as is shown in FIG. 1, or in any other desired combination. The number and location of transceiver antennas 24 can be varied, as desired.

A data logging system is preferably provided for measuring, and optionally storing or recording, information pertaining to at least one process condition as measured by at least one circuit-embedded food particle 8. Such data logging can be continuous, intermittent or combinations thereof, and further location and data logging embodiments are envisioned. For example, process information can be recorded for certain portions of the process path and read at prescribed locations, or recorded, and stored, for a majority of the process path and read at a transceiver after process completion and at some distance from the process space.

Figure 6:
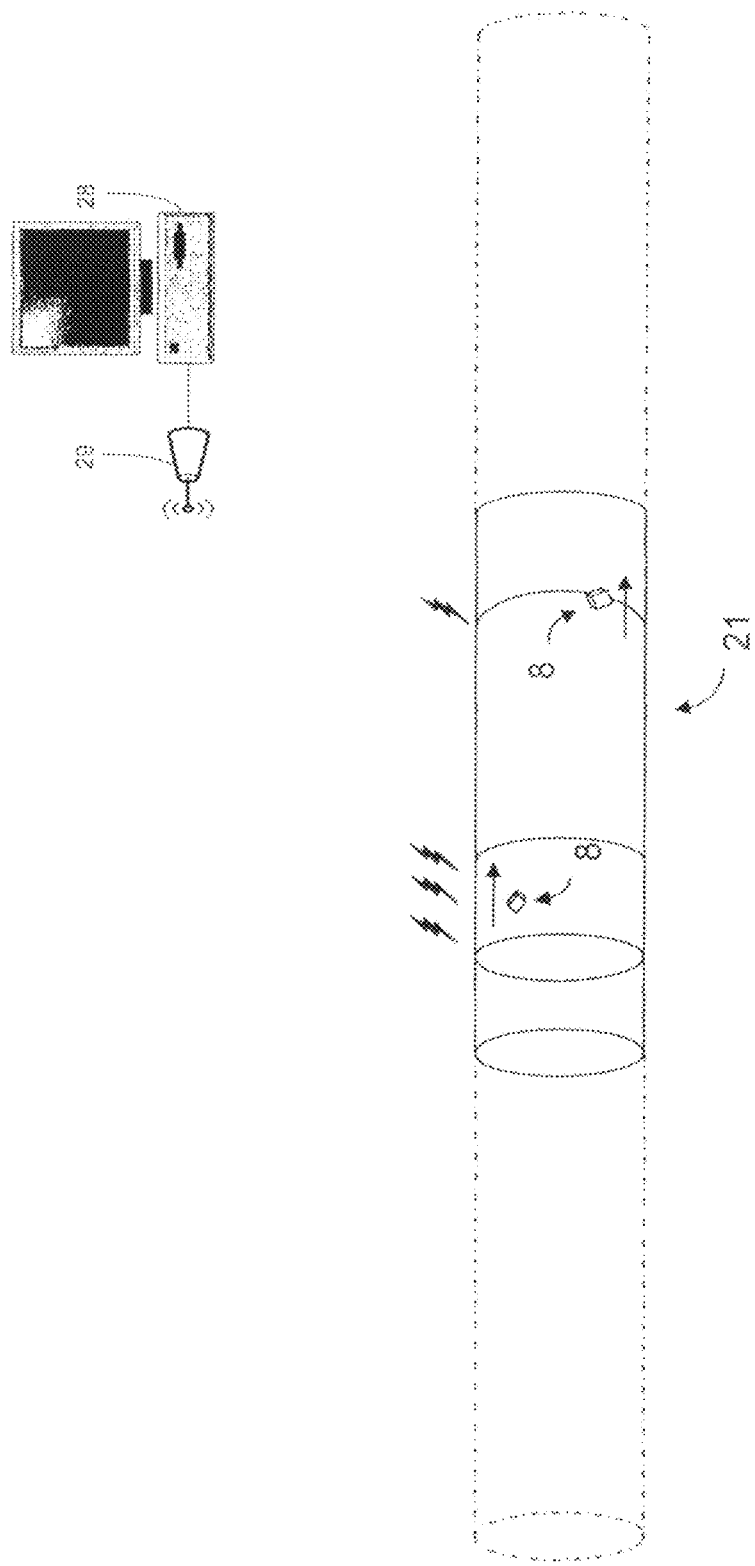
FIG. 6 is a schematic view showing measurement along at least a portion of the length of the process path, and measurement at a discrete spatial plane of the process path.

Certain location and data logging embodiments are shown in FIG. 6, and in FIG. 1. When a condition-measuring food particle 8 passes by a transceiver antenna 24, the time of passage, temperature of the transducer 10 and the ID of the transducer 10 are communicated to a computer 28 for real time data monitoring and storage using, for example, a communication module 27 capable of communicating with a corresponding wireless transceiver 29. As an alternative, wired communications can similarly be used. Each transceiver antenna 24 is preferably connected to a separate communication module 27.

When data is transmitted to the computer 28 by a communication module 27, the computer captures the ID of the transceiver antenna 24 that the transducer 10 is then passing through. The computer 28 can also capture the identification (ID) of the communication module 27, if desired. This data enables the creation of a time-temperature-location history for each and every transducer 10 that passed through the process system. The compiled data can then be used to analyze the variation in residence time (RTD) and temperature for similar simulation particles. This can be used to develop a scheduled process for sterilization or pasteurization of food products, preferably making use of lethality accumulated in the heating section 5 of the apparatus 1, as well as the lethality accumulated in the holding section 6. Still further, the measured process condition can be used to provide at least near real-time feedback such that the timing pump 3 or backpressure pump 25 can be controlled to vary the process time experienced by a circuit-embedded food particle 8. In this way, certain overly conservative processing assumptions related to heating and flow characteristics of particulate foods can be avoided, which can minimize the amount of thermal load into the product beyond the point necessary to achieve commercial sterility, potentially improving the organoleptic quality and nutritional value of the food product. This allows a food product to be optimized by use of the monitored process data.

Still further process optimizations can be achieved using the foregoing process system. For example, certain embodiments of the present invention may be suitable for monitoring bakery processes for the manufacture of baked goods such as pastries, cookies, breads and the like, in continuous or batch oven operations. Embedded particles 8 can be placed at or below the surface of the baked goods during operations. In this way, the data collected could be used to optimize the thermal processes such as heating, cooling, and freezing cycles, and to identify thermal variability such as hot and cold spots in the product and/or the oven.

It will be understood that while the present invention has been described based on specific embodiments incorporating specified parts, the present invention further encompasses all enabled equivalents of the parts described, and that various changes in the details, materials and arrangement of parts which have been herein described and illustrated in order to explain the nature of this invention may be made by those skilled in the art within the principle and scope of the invention as expressed in the following claims.

What is claimed is:

1. A system for monitoring at least one process condition of a batch or continuous thermal treatment of a flowing liquid stream processed in a heat exchanger, wherein said at least one process condition is temperature, and wherein said system comprises:
    (a) at least one application specific integrated circuit identifiable by radio frequency signal;
    (b) said circuit having at least one sensor capable of measuring variation of said temperature at different locations within said flowing liquid stream in cooking or baking processes including temperatures up to 200° C. or down to −40° C.;
    (c) at least one transceiver capable of communication with said circuit; and
    (d) at least one particle embedded with said circuit, said particle further being within a heterogeneous fluid having a plurality of constituent food particles and flowing within said liquid stream.

2. The system of claim 1, wherein said at least one process condition further includes a process condition selected from the group consisting of liquid pH, particulate speed, liquid speed, liquid nutrient characteristics, particulate orientation, particulate position, and liquid salinity.

3. The system of claim 1, wherein said process condition is particulate temperature.

4. The system of claim 1, wherein said process condition. is fluid temperature.

5. The system of claim 1, wherein said temperature measurement is accurate within 1° C.

6. The system of claim 1, wherein said at least one process condition further includes system pressure, and wherein said system pressure is measured up to 1 kpsi.

7. The system of claim 1, wherein said at least one process condition further includes system pressure, and wherein said system pressure is measured up to 150 kpsi.

8. The system of claim 1, wherein said particle has a center, and wherein said circuit is located approximately at the center of said particle.

9. The system of claim 1, wherein said circuit is located within a native constituent food particle.

10. The system of claim 1, wherein said circuit is located within said particle, and said particle emulates at least one physical characteristic of a native constituent food-particle.

11. The system of claim 10, wherein said physical characteristic is selected from the group consisting of geometry, density, and volume.

12. The system of claim 1, wherein said circuit is located within said particle, and said particle emulates at least one thermal characteristic of a native constituent food particle.

13. The system of claim 12, wherein said thermal characteristic is selected'from the group consisting of thermal diffusivity, thermal conductivity, and specific heat capacity.

14. The system of claim 1, wherein said measurement of variation of said at least one process condition is logged along at least a portion of a process path defined for said thermal treatment.

15. The system of claim 1, wherein said measurement of variation of said at least one process condition provides substantially real-time feedback to control said at least one process condition.

16. The system of claim 1, wherein said measurement of variation of said at least one process condition is logged at at-least one discrete location along a process path defined for said thermal treatment.

17. The system of claim 16, wherein said measurement of variation of said at least one process condition is logged along at least a portion of said process path defined for said thermal treatment and said at-least one discrete location along said process path.

18. The system of claim 1, wherein said temperature is measured in a range including temperatures from 100° C. to 140° C.

19. A method of measuring process conditions of a batch or continuous thermal treatment of a flowing liquid stream processed in a heat exchanger, said method comprising the steps of:
    (a) providing at least one application specific integrated circuit identifiable by radio frequency signal having at least one sensor capable of measuring variation of at least one process condition within said flowing liquid stream, wherein said at least one process condition is temperature;

(b) providing said circuit within a heterogeneous fluid associated with said batch or continuous thermal treatment within said flowing liquid stream; and (c) measuring variation of said temperature, as determined by said circuit at different locations within said flowing liquid stream, in cooking or baking processes including temperatures up to 200° C. or down to −40C.

20. The method of claim 19, which further includes the step of using said measured process condition to provide substantially real-time feedback for controlling said at least one process condition.

21. The method of claim 20, wherein said measured process condition is associated with an aseptic process.

22. The method of claim 20, wherein said measured process condition is associated with a non-aseptic process.

23. The method of claim 19, which further includes the step of measuring said at least one process condition in a resistive or radiation heating process.

24. The method of claim 19, which further includes the step of embedding at least one circuit in at least one particle within said heterogeneous fluid, and wherein said heterogenous fluid has a plurality of constituent food particles.

25. The method of claim 24, wherein said particle emulates at least one characteristic of a native constituent food particle selected from the group consisting of physical, thermal, and dielectric characteristics.

26. The method of claim 25, wherein said selected characteristic is a dielectric characteristic, and wherein said dielectric characteristic is electrical conductivity.

27. The method of claim 19, wherein said thermal treatment is selected from the group consisting of sterilization treatment, pasteurization treatment, and preservation treatment.

28. The method of claim 19, which further includes the step of logging said measured variation of said at least one process condition along at least a portion of a process path defined for said thermal treatment.

29. The system of claim 1, wherein said at least one process condition measured within said flowing liquid stream is a continuously variable process condition.

30. The system of claim 1, wherein said sensor is capable of directly measuring numerical values of said temperature.

31. The method of claim 19, wherein said variation of said at least one process condition within said flowing liquid stream is continuously measured.

32. The method of claim 19, wherein said sensor is capable of directly measuring numerical values of said temperature, and wherein said measuring further includes the step of directly measuring varying numerical values of said temperature within said flowing liquid stream.

33. The method of claim 19, which further includes the step of logging said measured variation of said at least one process condition at at-least one discrete location along a process path defined for said thermal treatment.

34. The system of claim 33, which further includes the step of logging said measured variation of said at least one process condition along at least a portion of said process path defined for said thermal treatment and at said at-least one discrete location along said process path.

35. The method of claim 19, wherein said temperature is measured in a range including temperatures from 100° C. to 140° C.

* * * * *